United States Patent [19]

Mears et al.

[11] Patent Number: 4,927,438

[45] Date of Patent: May 22, 1990

[54] HORIZONTAL LAMINAR AIR FLOW WORK STATION

[75] Inventors: Eric L. Mears, Rockport; Robert E. Jennings, Andover, both of Mass.

[73] Assignee: Varian Associates, Inc., Palo Alto, Calif.

[21] Appl. No.: 290,889

[22] Filed: Dec. 22, 1988

Related U.S. Application Data

[63] Continuation of Ser. No. 126,656, Dec. 1, 1987, abandoned.

[51] Int. Cl.⁵ .......... B01D 50/00

[52] U.S. Cl. .......... 55/385.2; 55/DIG. 29; 55/DIG. 18; 55/473; 98/115.3

[58] Field of Search .......... 55/385.2, DIG. 29, 473, 55/DIG. 18; 98/115.3

[56] References Cited

U.S. PATENT DOCUMENTS

| | | | |
|---|---|---|---|
| 3,229,611 | 1/1966 | Berger | 98/115.3 |
| 3,254,588 | 6/1966 | Truhan | 98/115.3 |
| 3,318,076 | 5/1967 | Baker | 55/DIG. 29 |
| 3,354,495 | 11/1967 | Lawrence, III | 55/385 |
| 3,380,369 | 4/1968 | Allander | 98/115.3 |
| 3,494,112 | 2/1970 | Deckas | 55/DIG. 18 |
| 3,645,191 | 2/1972 | Asker et al. | 98/36 |
| 3,664,253 | 5/1972 | Asker et al. | 98/36 |
| 3,728,866 | 4/1973 | Layton | 62/126 |
| 3,776,121 | 12/1973 | Truhan | 98/33 R |
| 3,942,964 | 3/1976 | Shuler | 55/494 |
| 3,998,142 | 12/1976 | Foreman et al. | 98/36 |
| 4,009,647 | 3/1977 | Howorth | 98/36 |
| 4,050,368 | 9/1977 | Eakes | 98/115.3 |
| 4,100,847 | 7/1978 | Norton | 55/DIG. 29 |
| 4,211,155 | 7/1980 | Stoll et al. | 98/115.3 |
| 4,548,627 | 10/1985 | Landy | 55/385.1 |
| 4,660,464 | 4/1987 | Tanaka | 55/385 A |
| 4,699,640 | 10/1987 | Suzuki et al. | 55/385.1 |
| 4,770,680 | 9/1988 | Machida et al. | 55/385.1 |

FOREIGN PATENT DOCUMENTS

| | | | |
|---|---|---|---|
| 134239 | 10/1980 | Japan | 98/115.3 |

*Primary Examiner*—Bernard Nozick

*Attorney, Agent, or Firm*—Stanley Z. Cole; Gerald M. Fisher; Terrence E. Dooher

[57] ABSTRACT

A load chamber of a load lock is provided with a vertical air curtain which isolates the load chamber from the general clean room environment. Horizontal air flows generated in the load chamber bathe wafers held horizontally in the chamber with filtered air. These horizontal air flows are captured by the air curtain and recirculated to filters which provide horizontal and vertical air flows in the load chamber. If desired, the vertical and horizontal flows may be driven by the air supply mechanism of the clean room itself.

9 Claims, 4 Drawing Sheets

HORIZONTAL LAMINAR AIR FLOW WORK STATION

This application is a continuation of application Ser. No. 126,656, filed 12-1-87, now abandoned.

1. Field of the Invention

This invention relates to semiconductor processing equipment and, in particular, to a load chamber providing selected air flow patterns for reducing particulate contamination.

BACKGROUND OF THE INVENTION

As the trend toward higher device densities and smaller device geometries continues, particulate contamination has become an increasingly important problem. As is well known, a single particle on the order of one micron in diameter deposited on the surface of a semiconductor wafer can cause the loss of the entire wafer. One prior art approach to solving the particulate contamination problem has been to provide clean rooms for semiconductor processing. In the typical clean room, laminar air flows are generally directed downward from the ceiling of the clean room toward either floor or wall exhausts. The laminar air flows bathe the operator and the semiconductor equipment in filtered air. In some clean rooms, horizontal air flows from one clean room wall to an opposed clean room wall are provided.

The general approach of providing filtered air flows in clean rooms does not, however, solve the problem of particulate generation in areas which, by equipment design necessity, are sheltered from the clean room air flows. Once such area is the loading chamber region of many machines incorporating vacuum load locks. The load chamber is located externally of the load lock in the region adjacent the entrance to the load lock.

SUMMARY OF THE INVENTION

The present invention provides a load station for semiconductor processing apparatus which includes a load chamber having means for generating a horizontal flow of filtered air to bathe wafers held in the load chamber while simultaneously generating a vertical air curtain which flows across the entrance opening of the load chamber to isolate the horizontal flow generated in the load chamber from the clean room. In this manner the laminar downward flow of air in the clean room is not disturbed by the horizontal flow in the load chamber and the wafers in the load chamber are protected from particulate generation in the region above the wafer cassettes in the load chamber by the horizontal air flow.

In addition to the vertical air curtain, a laminar flow of filtered air directed vertically downward is also generated above the wafer cassettes, so that there are no regions of stagnate air in the load chamber. The horizontal flow merges with the vertical laminar downward flow. Air return slots are provided in the lower surface of the load chamber.

DETAILED DESCRIPTION OF THE INVENTION

Figure 1:
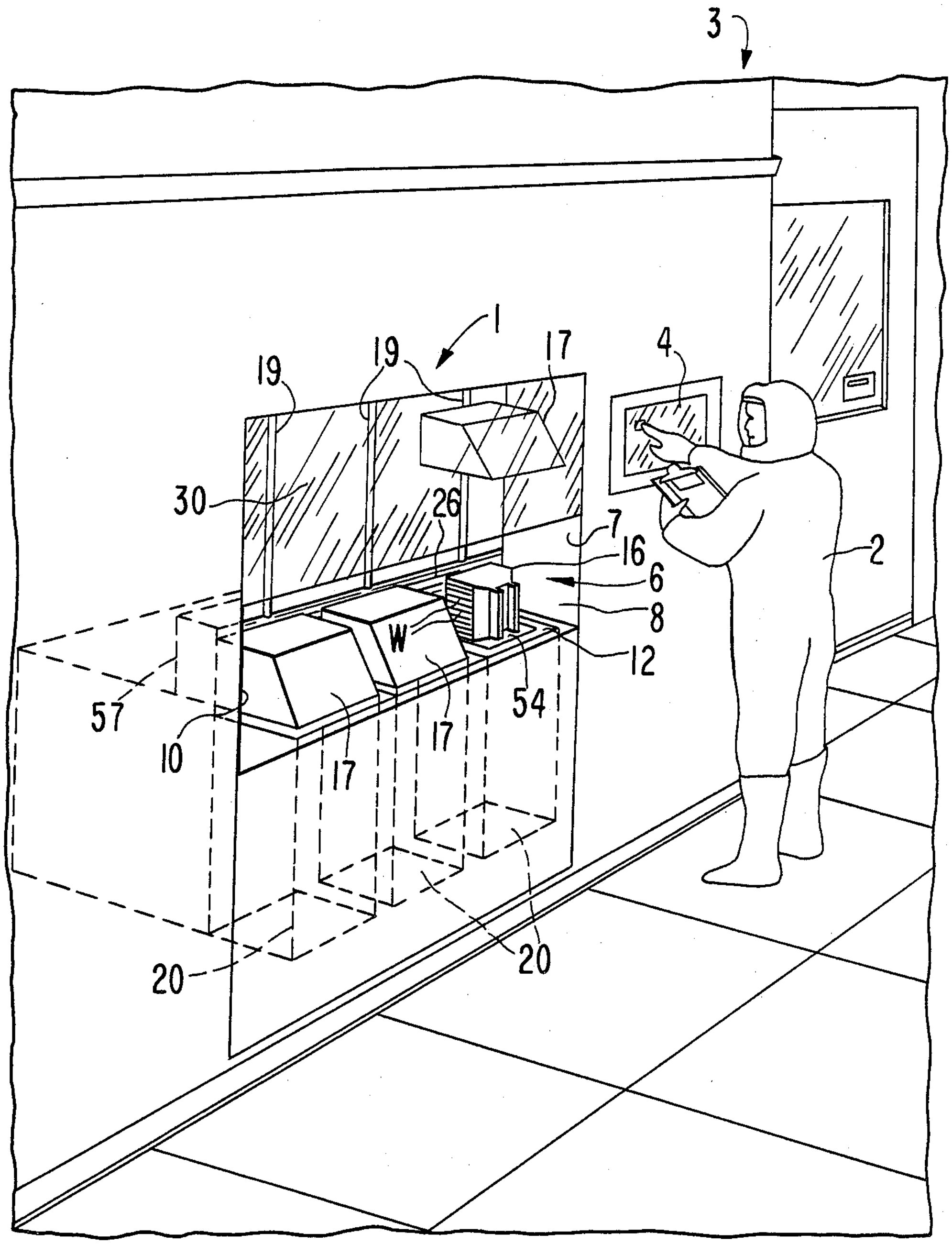
FIG. 1 shows a schematic perspective view of one embodiment of the load station of the present invention in the context of a semiconductor clean room.
Figure 2:
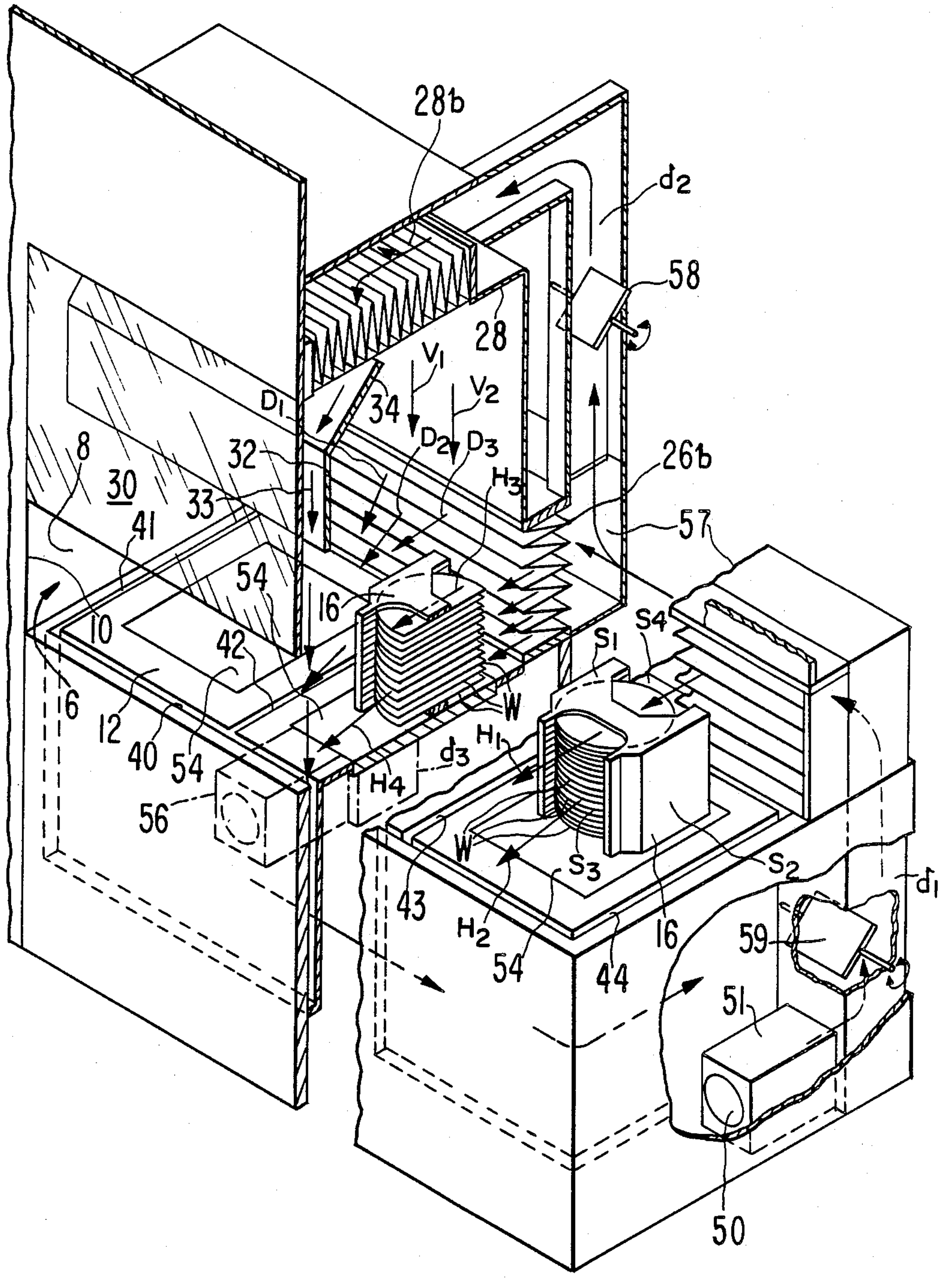
FIG. 2 shows a more detailed partially cut away perspective view of the embodiment shown in FIG. 1.

FIG. 1 shows a schematic perspective view of one embodiment of load station 1 of the present invention in the context of semiconductor clean room 3. Operator 2 controls processing parameters via control panel 4. In the embodiment shown in FIG. 1, load chamber 6 of load station 1 has a generally rectangular shape bounded by table 12, side walls 7 and 10, back wall 26 and ceiling wall 28 (FIG. 2). Front opening 8 of load station 1 connects load chamber 6 to clean room 3 and provides access to wafer cassettes 16, only one of which is shown in FIG. 1, by operator 2 and/or cassette transfer apparatus (not shown) in clean room 3.

Load lock chambers 20 are located beneath load lock covers 17, one of which is shown in its elevated position in FIG. 1. Load lock covers 17 are raised and lowered on tracks 19 by conventional mechanisms (not shown). When wafers W in cassettes 16 are to be processed, cassettes 16 are lowered into load lock chambers 20 by elevator means (not shown). Wafers are then transferred from cassette 16 by transfer mechanisms (not shown) to wafer processing equipment (not shown), for example, ion implantation equipment, which is located in a vacuum chamber (not shown) which communicates with load locks 20 and which is vacuum isolated from clean room 3 by load lock chambers 20.

FIG. 2 shows a perspective view of load chamber region 6 of load station 1. Table 12 includes three elevator platforms 54, each of which supports a wafer cassette 16 (only two of which are shown in FIG. 2). Platforms 54 are lowered by elevator mechanisms (not shown) to load cassettes 16 into chambers 20. Cassettes 16 include side walls $S_1$ and $S_2$. Grooves (not shown) in side walls $S_1$ and $S_2$ support wafers W in a generally horizontal orientation in wafer cassettes 16. Front $S_3$ and back $S_4$ of cassette 16 are open and permit passage of horizontal air flows between wafers W in cassettes 16 as indicated by arrows $H_1$, $H_2$, $H_3$ and $H_4$, from horizontal air filter 26*b* recessed in back wall 26 toward front opening 8. Preferably, the vertical extent of horizontal air filter 26*b* is somewhat greater than the height of cassette 16. In one embodiment filter 26*b* is a HEPA filter.

Table 12 includes air return slots 40 through 44 which run along the top edges of Table 12 and between cassettes 16. Air return slots 40–44 are connected by duct work (not shown) of conventional design to air intake 50 of blower 51. Air from blower 51 is communicated via duct $d_1$ to horizontal air filter 26*b* and via ducts $d_1$ and $d_2$ to vertical air filter 28*b* recessed in ceiling wall 28 of load chamber 6. Plates 32 and 34 attached to end walls 7 and 10 form, together with front plate 30, a generally vertical passage 33 which directs a curtain of filtered air vertically downward from air filter 28*b* across front opening 8 to air return slot 40 which runs along the front edge of table 12. Plate 34 slopes inward to channel flow from vertical air filter 28*b* and to accelerate the flow into vertical passage 33.

In operation, air blower 51 drives air via duct $d_1$ to horizontal air filter 26*b*. Horizontal air flows from air filter 26*b*, indicated schematically by arrows $H_1$ through $H_4$, pass between wafers W in cassettes 16 from air filter 26b toward front opening 8. Air blower 51 also drives air via ducts $d_1$ and $d_2$ to vertical air filter 28b. A first portion of filtered air from vertical air filter 28b flows downward into load chamber 6 as indicated schematically by arrows $V_1$ and $V_2$ and converges with air flowing horizontally from air filter 26b to form diagonal flows indicated schematically by arrows $D_1$ through $D_3$ in FIG. 2. This convergence occurs in a non-turbulent manner. Horizontal air filter 26b extends sufficiently far above the tops of cassettes 16 that these diagonal flows approach the horizontal above the tops of wafer cassettes 16. A second portion of filtered air from vertical air filter 28b flows downward through vertical passage 33 and generates a vertical curtain of filtered air, typically of higher velocity than the first portion, flowing across opening 8 to air return slot 40 which runs along the front edge of table 12. This vertical curtain of laminar air also has higher velocity than horizontal flows $V_1$–$V_4$ and captures the horizontal flows $V_1$–$V_4$ and directs them into air slot 40. The horizontal flows do not penetrate the vertical curtain of air because of velocity and inertial differences, and hence the generally vertical downward flow (generated by conventional means not shown) which is typically present in clean room 3 is isolated from, and thus not disturbed by, the horizontal flows present in load chamber 6 of load station 1.

In the event that operator 2 or automated equipment (not shown) in clean room 2 breaks the air curtain, the horizontal flows $H_1$–$H_4$ of filtered air bathing wafers W, flow toward operator 2 so that particles generated by operator 2, particularly particles which are generated by operator 2 in load chamber 6 above wafer cassettes 16 are carried away from wafers W and do not contaminate the surfaces of wafers W.

Narrow slots 41, 42, 43 and 44 draw in both horizontal air flows and vertical air flows between wafer cassettes 16 and between wafer cassettes 16 and side walls 7 and 10 so that there is no net exchange of air between clean room 3 and load chamber 6.

As shown by the dotted lines in FIG. 2, in one alternate preferred embodiment, two separate air blowers 56 and 51 draw air from slots 40–44 and pressurize both sides of duct 57. This arrangement provides greater flow volume more evenly distributed along duct 57. Dampers 58 and 59 may be turned to adjust relative vertical and horizontal flow velocities.

Alternatively, in another embodiment, the output of blower 51 may be connected to filter 26b by a first duct (not shown) and the output of blower 56 may be connected to filter 28b by a second duct (not shown) disjoint from the first duct. The relative speeds of the horizontal and vertical flows can then be adjusted by adjusting the speed of the individual blowers.

The embodiments shown in FIG. 2 are advantageous in that they are simple, self-contained units which recirculate filtered air. However, in the absence of air cooling and humidification devices, which may be employed if desired, the temperature of the recirculated air may tend to rise and there may be a concomitant decrease in the humidity of the recirculating air. Also, static charge may build up on wafers W causing damage to the delicate semiconductor devices on wafers W in the presence of very dry moving air.

Figure 3:
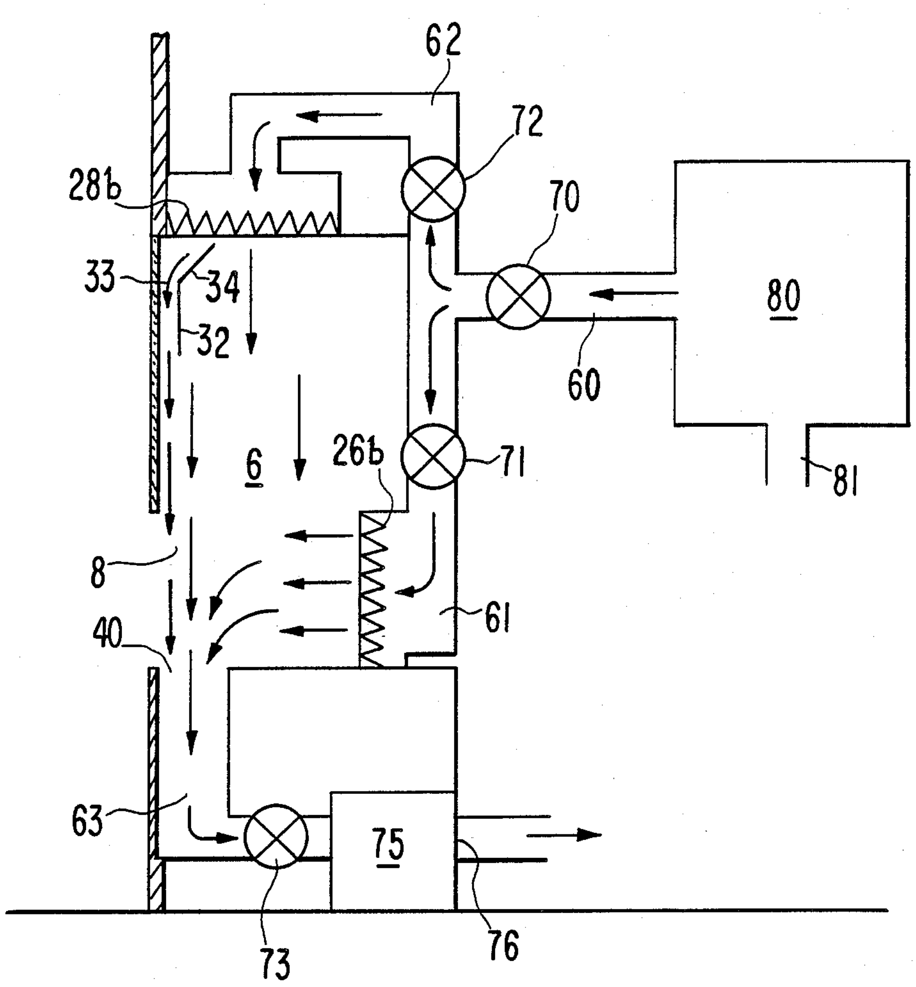
FIG. 3 shows a partially schematic cross-sectional view of an alternate embodiment of the load station of the present invention.
Figure 4:
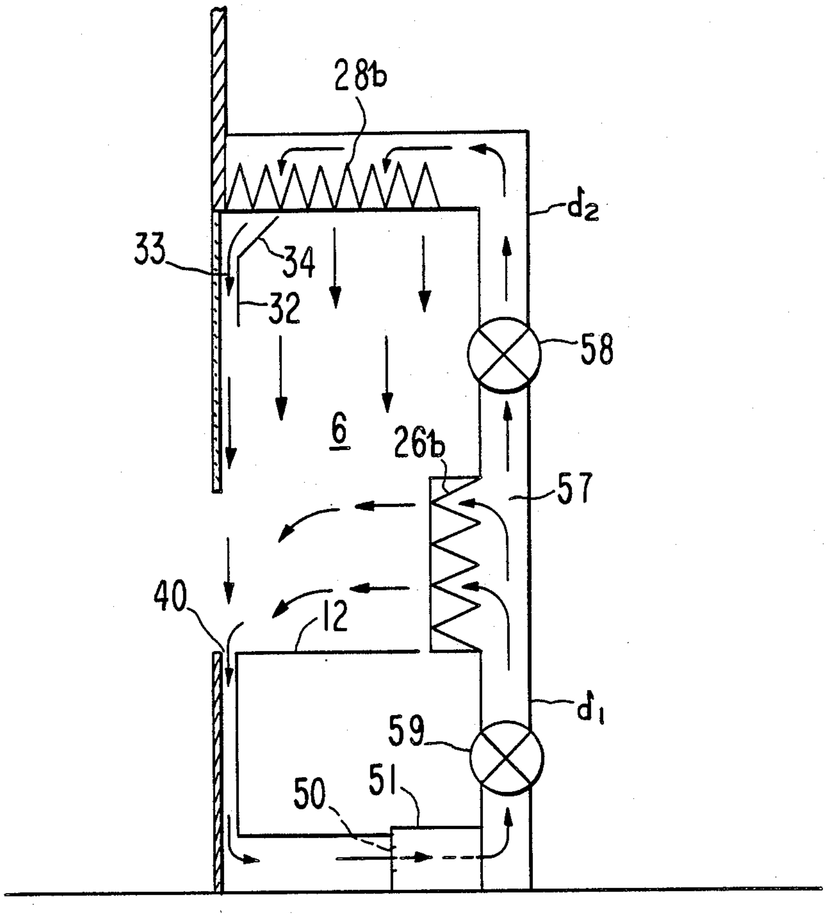
FIG. 4 shows a partially schematic cross-sectional view of the embodiment shown in FIG. 2.

FIG. 3 shows schematically yet another embodiment of the invention which is similar to FIG. 2, except that ducts $d_1$ and $d_2$ are not present. In the embodiment shown in FIG. 3, duct 60 is provided which is adapted to be connected to clean room air supply means 80 which supplies filtered air to clean room 3. Air supplied by air supply means 80 is conveyed from duct 60 to vertical air filter 28b via branch duct 62 and to horizontal air filter 26b via branch duct 61. Air return duct 63 connects slots 40–44 to air blower 75 whose output end 76 is adapted to be connected to air intake duct 81 connected to clean room air supply 80. Flow control dampers 70, 71, 72, and 73 in ducts 60, 61, 62 and 63 respectively control the flow rate in their respective ducts.

This latter embodiment has the advantage that fully conditioned, humidity controlled filtered air from clean room air supply 80 is supplied to load chamber 6, which obviates any potential heat or static charge build-up problem.

The embodiment shown in FIG. 3 requires damper balance to adjust the vertical and horizontal flow rates. The embodiment shown in FIG. 3 is compatible with the embodiments shown in FIG. 2 in the sense that same hardware and blowers can be used with changes only to the ducts $d_1$ and $d_2$.

In another embodiment similar to that shown in FIG. 3, air blower 75 is not present and duct 63 is connected directly between air return slots 40–44 and air intake duct 81 of clean room air supply 80.

The above embodiments are meant to be exemplary and not limiting, and in view of the above disclosure many modifications will be obvious to one of ordinary skill in the art without departing from the scope of the invention.

We claim:

1. A load station for semiconductor wafers comprising:

a chamber having an opening;

means for supporting at least one cassette for holding semiconductor wafers oriented horizontally in said chamber, channel means comprising;

first channel means for directing a horizontal flow of air into said chamber toward a cassette supported by said means for supporting and toward said opening and second channel means for directing a first stream of air to flow vertically downward into said chamber; and means for generating a second stream of air forming an air curtain having a velocity greater than the velocity of said first stream of air, said means for generating being capable of producing a downward velocity in said curtain of air sufficient to prevent said horizontal flow from penetrating said curtain of air so that the interior of said chamber is isolated from the environment external to said chamber opening;

said channel means including air return slot means in said chamber for receiving air from said horizontal flow, said first stream and said second stream.

2. A load station as in claim 1 wherein said channel means includes means for filtering said horizontal flow of air and means for filtering said first stream of air.

3. A load station as in claim 2 wherein said means for supporting includes means for supporting a plurality of cassettes for holding semiconductor wafers oriented horizontally and said air return slot means comprises a slot located between at least two of said means for supporting for returning air to a means for generating moving air so that air is to said chamber through said means for filtering said horizontal flow and said means for filteirng said first stream of air.

4. A load station as in claim 3 wherein said chamber comprises a generally horizontal lower surface and said air return slot means comprises a slot in said lower surface for returning air receiving by said slot to said means for generating moving air.

5. A load station as in claim 1 including blower means for generating said horizontal flow of air and for generating said first stream of air.

6. A load station as in claim 5 wherein said blower means for generating comprises two air blowers in parallel.

7. A load station as in claim 5 wherein said blower means for generating comprises a first air blower for generating said first stream of air flowing vertically downward and a second air blower for generating said horizontal flow.

8. A load station as in claim 1 wherein said channel means comprises first duct means for connecting to an air supply system of a clean room so that air from said air supply means is supplied to said first channel means and said second channel means; and, second duct means for conveying air from said chamber to an exhaust port.

9. A load station as in claim 8 further including means for connecting said exhaust port to an air intake of said air supply of said clean room.

* * * * *